United States Patent [19]

Fujimura et al.

[11] Patent Number: 5,299,854
[45] Date of Patent: Apr. 5, 1994

[54] SEAT BELT RETRACTOR LOCKING MECHANISM USING DEFORMABLE FORCE REDUCING PORTION

[75] Inventors: Yoshiichi Fujimura, Shiga; Shizutaka Matsuura, Hikone, both of Japan

[73] Assignee: Takata Corporation, Tokyo, Japan

[21] Appl. No.: 826,048

[22] Filed: Jan. 27, 1992

[30] Foreign Application Priority Data

Jan. 28, 1991 [JP] Japan .................................. 3-008765

[51] Int. Cl.$^5$ ............................................. B60R 22/28
[52] U.S. Cl. ................................. 297/472; 297/478; 280/806
[58] Field of Search ............... 297/472, 476, 480, 478; 280/805, 806, 808; 242/107.2

[56] References Cited

U.S. PATENT DOCUMENTS

| 3,481,624 | 12/1969 | Barecki | 280/805 |
| 3,973,650 | 8/1976 | Nagazumi | 280/805 |
| 4,457,251 | 7/1984 | Weman | 297/472 |
| 4,687,253 | 8/1987 | Ernst | 297/480 |
| 5,076,610 | 12/1991 | Struck | 280/805 |
| 5,154,368 | 10/1992 | Fujimura | 297/478 |

*Primary Examiner*—Flemming Saether
*Attorney, Agent, or Firm*—Armstrong, Westerman, Hattori, McLeland & Naughton

[57] ABSTRACT

The seat belt retractor of the present invention is provided with a fragile portion γ near a supporting section of a rotating shaft 21 on two side walls 2b (and 2a—not shown) of a case 2. The fragile portion γ undergoes plastic deformation or rupture when a load exceeding a predetermined value is applied on a seat belt 1 through the rotating-squeezing member 20 and a rotating shaft 21 by pulling force. When the fragile portion γ undergoes plastic deformation or rupture, the rotating-squeezing member 20 is moved toward loading direction, and the rotating-squeezing member 20 is separated from the sliding-squeezing member 19. Then, the rotating-squeezing member 20 is turned over, and the squeezing force on the seat belt 1 by the rotating-squeezing member 20 and the sliding-squeezing member 19 is alleviated. As the result, the application of highly concentrated load on the seat belt can be avoided.

7 Claims, 11 Drawing Sheets

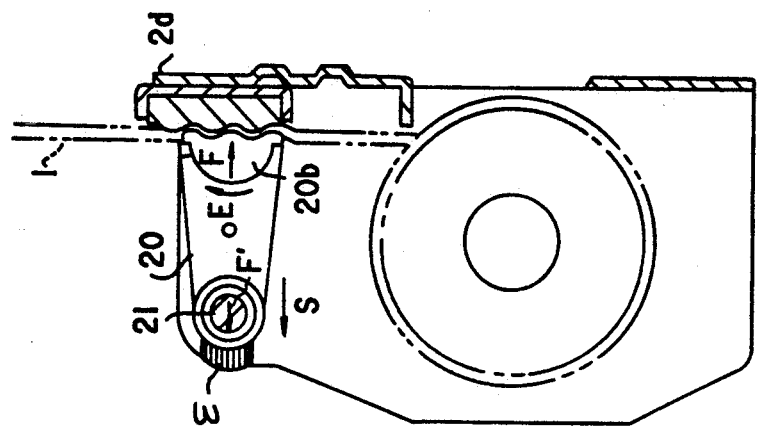
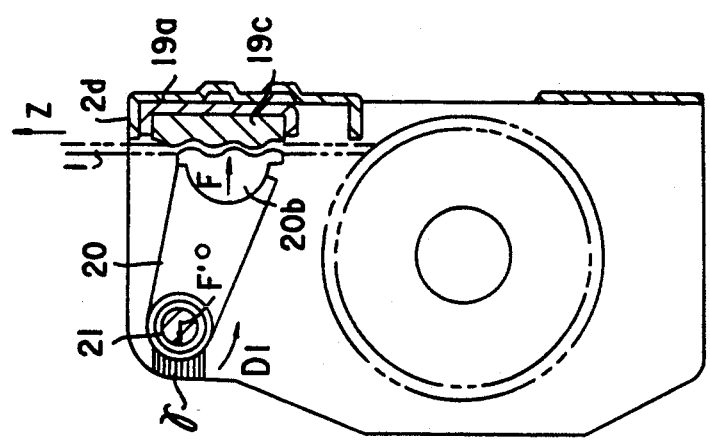
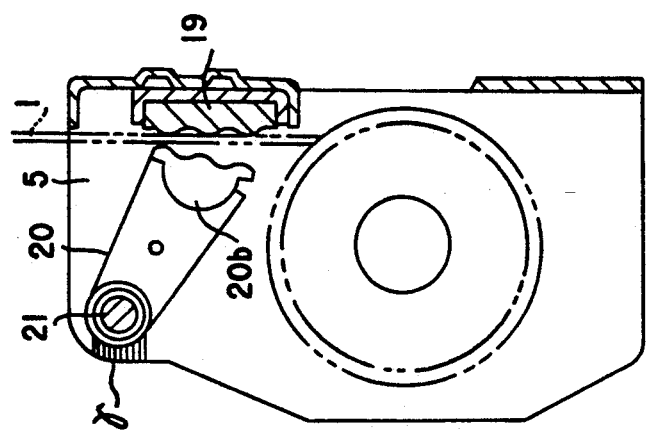

SEAT BELT RETRACTOR LOCKING MECHANISM USING DEFORMABLE FORCE REDUCING PORTION

BACKGROUND OF THE INVENTION

The present invention relates to a seat belt retractor, which comprises a first emergency locking means for locking a reel shaft where a seat belt is wound up when acceleration higher than a predetermined value is applied on an vehicle, and a second emergency locking means for locking the seat belt itself.

As one of conventional type seat belt retractors, there is a seat belt retractor as shown in FIG. 12.

As it is evident from FIG. 12, this seat belt retractor is provided with a reel shaft 102, on which a seat belt 101 is wound up, and with a ratchet wheel 103, which is coaxially and integrally mounted on said reel shaft. Also, the seat belt retractor is provided with a first emergency locking means 105 for locking the reel shaft 102 by engaging an stop member 104 with the ratchet wheel 103 and a second emergency locking means 110 for locking the seat belt 101 pulled out from the reel shaft 102 by squeezing the seat belt between a sliding-squeezing member 109 and a clamp member 107, which will be described below. The second emergency locking means 110 is provided with a rotating-squeezing member 108, one end of which is rotatably mounted on a case 106 and a clamp member 107 thereof is mounted on a squeezing end of the seat belt 101, and it is further provided with the sliding-squeezing member 109, which is positioned face-to-face to the rotating-squeezing member 108 and is slidably mounted on the case 106. On each of squeezing surfaces of the clamp member 107 and the sliding-squeezing member 109 to the seat belt 101, squeezing sectors 107a and 109a are formed in smooth and irregular shapes in directions crossing transversely the directions to wind up or pull out the seat belt 101.

By such seat belt retractor provided with the first and the second emergency locking means 105 and 110, it is possible not only to lock the reel shaft 102, but also to lock the seat belt 101 itself. Thus, the reliability can be extensively increased.

Meanwhile, when the second emergency locking means 110 is operated in an emergency such as vehicle collision and the seat belt 101 is locked, very strong force may be applied on the squeezed seat belt 101 in some cases.

That is, when the seat belt 101 is squeezed in normal operation of the second emergency locking means 110, the seat belt 101 is squeezed and locked as the rotating-squeezing member 108 is rotated up to a position given by 108' in a direction of the arrow D₁. In some cases, however, a strong force may be applied to pull out the seat belt further beyond the normal squeezing state of the seat belt held by the rotating-squeezing member 108 and the sliding-squeezing member 109

In such case, lower end of the clamping member 107 of the rotating-squeezing member 108 bites into the seat belt 101 and squeezes the seat belt 101 with stronger force. As the result, strong force is concentrated on a squeezed portion of the seat belt 101

SUMMARY OF THE INVENTION

It is an object of the present invention to provide a seat belt retractor, by which it is possible to prevent extensive and concentrated loading of a seat belt even when a strong force is applied to pull out the seat belt beyond a normal state to squeeze the seat belt by operation of the second locking means.

To attain the above object, a seat belt retractor according to the present invention comprises a first emergency locking means for locking a reel shaft, on which a seat belt is wound up, and a second emergency locking means for locking by squeezing the seat belt pulled out from the reel shaft by a rotating-squeezing member, one end of which is rotatably supported on a case, and it is characterized in that said case is furnished with a fragile portion, which is deformed or ruptured to reduce the squeezing force on the seat belt by said rotating-squeezing member when a load higher than a predetermined value is applied on said case through an end of said rotating-squeezing member.

Also, the present invention is characterized in that said load of the predetermined value is defined by cross-sectional area of said fragile portion of said case.

In the seat belt retractor according to the present invention with the arrangement as described above, the second emergency locking means is operated in an emergency such as collision, and the seat belt is squeezed and locked. In this case, if the load applied through an end of the rotating-squeezing member by the force applied on the seat belt is lower than the predetermined value, the fragile portion of the case is not deformed, and the seat belt is locked in normal squeezed state.

In case the force applied on the seat belt is increased and the load applied through an end of the rotating-squeezing member is higher than the predetermined value, the fragile portion of the case is deformed or broken to reduce the squeezing force on the seat belt by the rotating-squeezing member. As the result, concentrated load by the squeezing force is not applied on the seat belt, and an occupant in the vehicle can be securely restrained and protected by the seat belt, and the reliability can be extensively increased.

Still other objects and advantages of the invention will in part be obvious and will in part be apparent from the specification.

The invention accordingly comprises the features of construction, combinations elements, and arrangement of parts which will be exemplified in the construction hereinafter set force, and the scope of the invention will be indicated in the claims.

BRIEF DESCRIPTION OF THE DRAWINGS

FIG. 7 (b) is a diagram showing the relationship between distortion of the fragile portion and compression force of the fragile portion;

DESCRIPTION OF THE PREFERRED EMBODIMENTS

Figure 1:
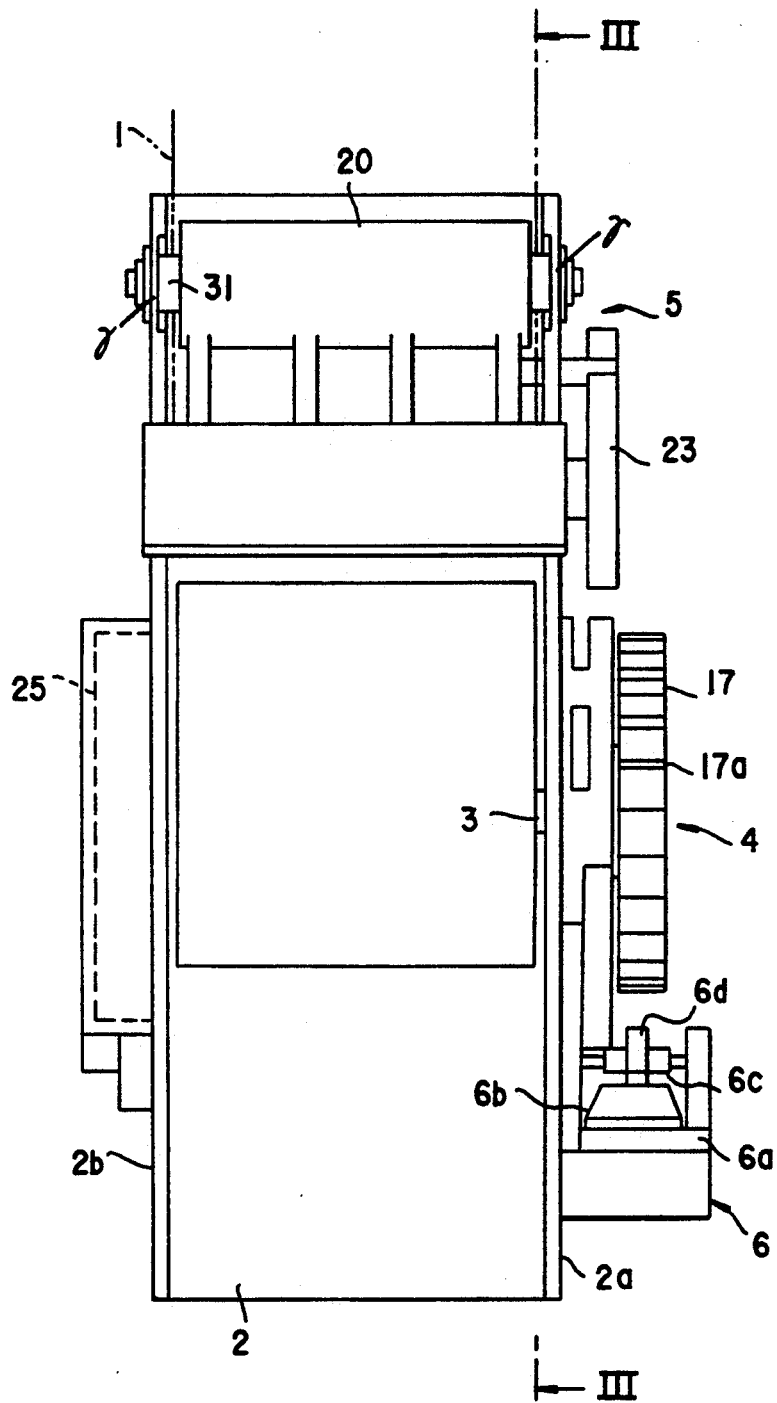
FIG. 1 is a side view of an embodiment of a seat belt retractor according to the present invention.
Figure 2:
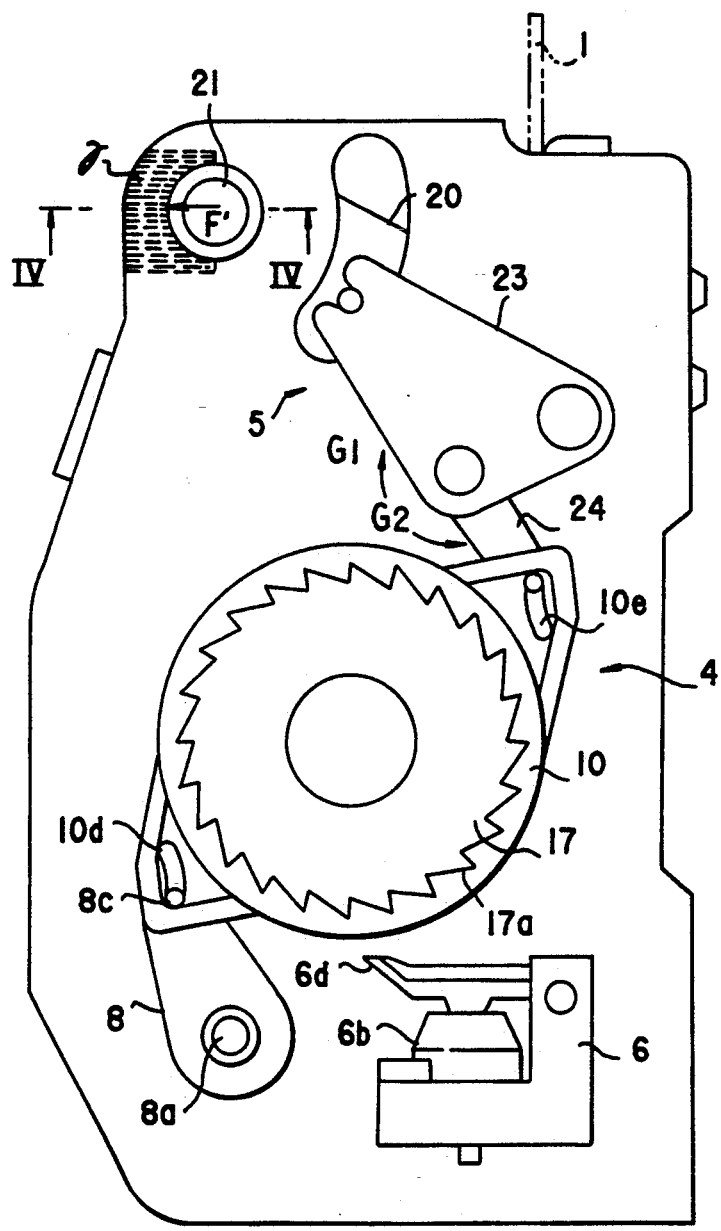
FIG. 2 is a front view of a seat belt retractor of the present embodiment.
Figure 3:
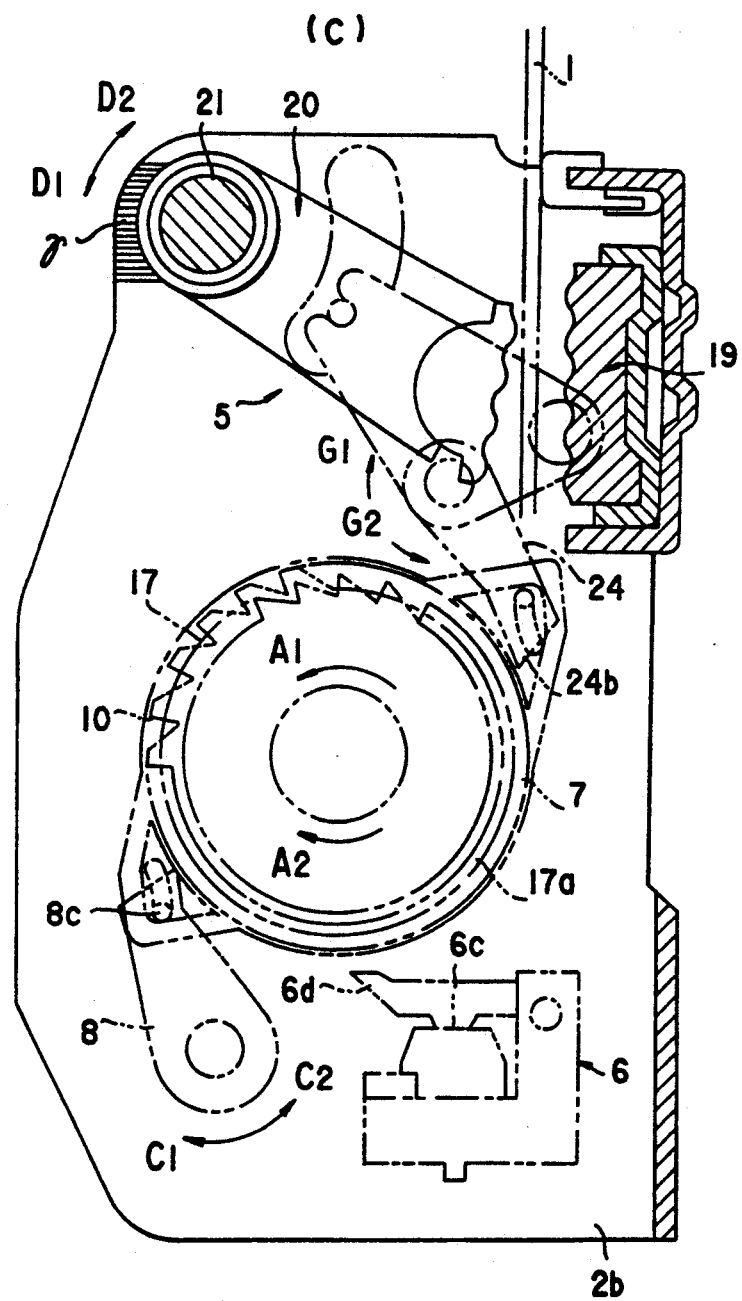
FIG. 3 is a cross-sectional view along the line III—III of FIG. 1.

As shown in FIG. 1 to FIG. 3, the seat belt retractor of the present invention comprises a reel shaft 3 rotatably supported on a case 2 for pulling out or winding up a seat belt 1, a first emergency locking means 4 for blocking rotation of the reel shaft 3, a second emergency locking means 5 for locking further pulling-out of the seat belt 1 by squeezing the seat belt 1 pulled out of the reel shaft 3, and an acceleration sensor 6 mounted on lower portion of one of side walls 2a of the case 2 and detecting sudden acceleration.

Figure 5:
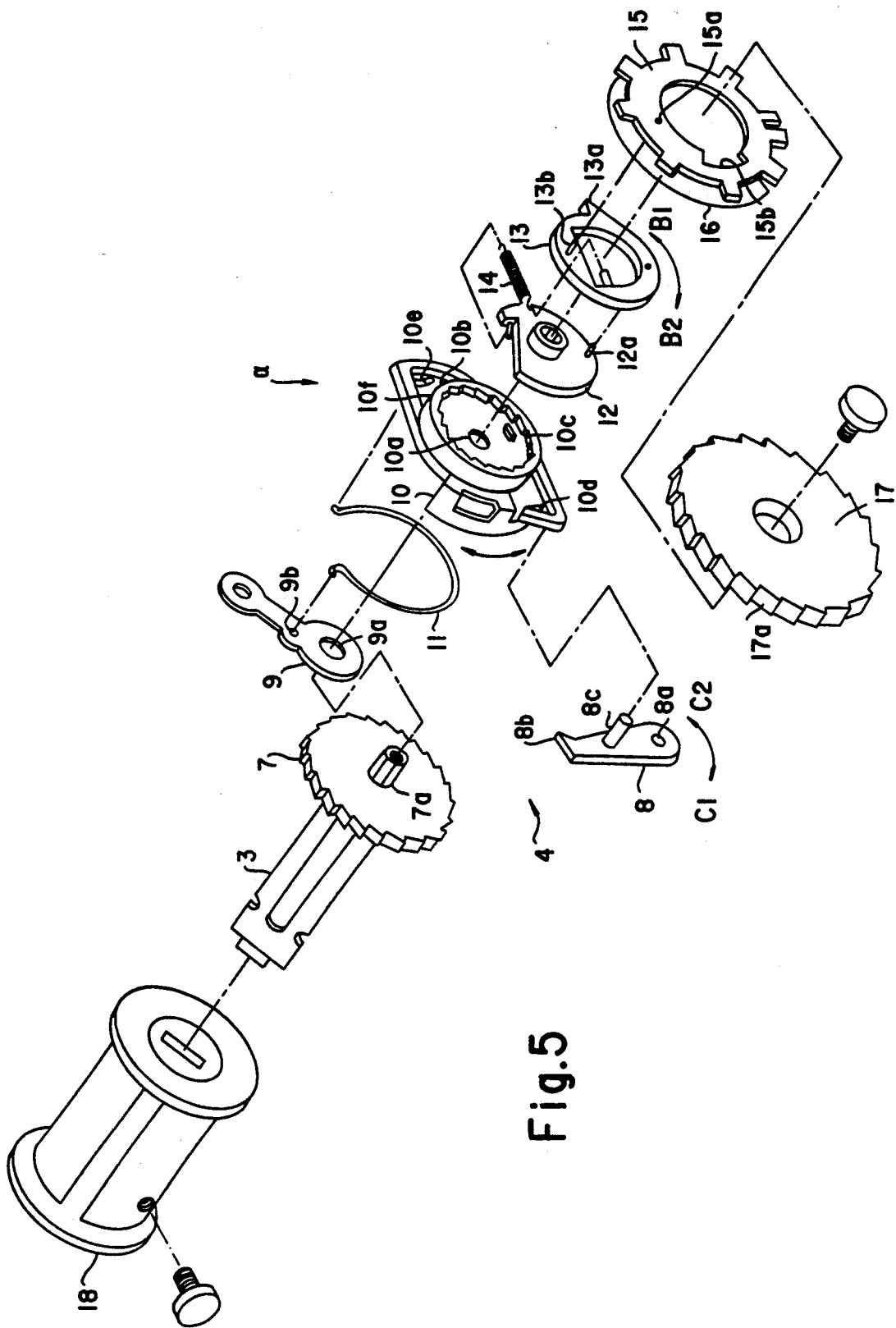
FIG. 5 is an exploded view of first emergency locking means for locking a reel shaft and movement transmitting means α.

The first emergency locking means 4 is provided with a ratchet wheel 7 mounted coaxially and integrally with the reel shaft 3 as shown in FIG. 5 and a first engaging member 8 rotatable around a rotating shaft 8a toward positions to engage with or separated from the ratchet wheel 7. The first emergency locking means 4 locks rotation of the reel shaft 3 when the first engaging member 8 is engaged with the ratchet wheel 7. In this case, the first engaging member 8 is rotated toward the direction C1 by a movement transmitting mechanism α and its stop pawl 8b engaged with the ratchet wheel 7. When it is rotated toward the direction C2, the engaging pawl 8b is separated from the ratchet wheel 7.

Describing the movement transmitting mechanism α in detail, a projection 7a coaxial with the reel shaft 3 is provided outside the ratchet wheel 7, and a tie plate 9 is freely engaged on this projection 7a through a through-hole 9a, and a lock ring 10 is freely engaged through a through-hole 10a at the center.

With a spring hanger 9b provided approximately at the center of the tie plate 9, one end of a spring member 11 is engaged, and the other end thereof is engaged with a spring hanger 10b of the lock ring 10. Accordingly, a pushing force to rotate the lock ring 10 toward the direction A2 is always applied by the spring member 11. Further, internal tooth 10c is formed on the lock ring 10, and two guide holes 10d and 10e are provided outside the internal tooth 10c. In one of the guide holes 10d, a pin 8c is engaged, which is formed between the engaging pawl 8b and the rotating shaft 8a of the first stop member 8. With the rotation of the lock ring 10 by more than a predetermined angle, the first engaging member 8 is rotated, and the engaging pawl 8b is engaged with tooth of the ratchet wheel 7.

On the projection 7a of the ratchet wheel 7 positioned outside the lock ring 10, a hook retainer 12 is fixed. On periphery of the hook retainer 12, a support pin 12a is projecting in parallel to the rotating of the reel shaft 3. Further, a hook 13 is pivotally and movably supported around the support pin 12a on the hook retainer 12. Between the hook retainer 12 and the hook 13, a compression coil spring 14 is furnished to rotate the hook 13 toward the direction B1 around the support pin 12a.

On a part of outer periphery of the hook 13, a pawl 13a engageable with internal tooth 10c of the lock ring 10 is formed, and a connecting pin 13b is provided on a portion, which is moved around the support pin 12a. Accordingly, the pawl 13a is normally separated from the internal tooth 10c because the hook 13 is pulled by the above compression coil spring 14.

An engaging hole 15a provided on outer periphery of a friction engaging member 15 formed in nearly ring-like shape is engaged with the connecting pin 13b, and the support pin 12a projecting through the hook 13 is positioned on a notch 15b formed on inner periphery of the friction engaging member 15. On outer periphery of the friction engaging member 15, a ratchet wheel 17 forming ratchets 17a on outer periphery is engaged by friction.

An acceleration sensor 6 is placed on an inertia body support case 6a as shown in FIG. 1, and it is provided with a barrel-shaped inertia body 6b, which is tilted by action of approximately horizontal acceleration, and also with an actuator 6c, which is rotated and displaced within a vertical plane corresponding to tilt displacement of the inertia body 6b. A free end the actuator 6c is formed as an engaging pawl 6d, which is engaged with the ratchet 17a on outer periphery of the ratchet wheel 17 when the actuator 6b is rotated by a certain angle.

In the figure, the reference numeral 18 is a reel member in cylindrical shape and having flanges on both ends, and it is engaged in the reel shaft 3 to wind up the seat belt.

Figure 6:
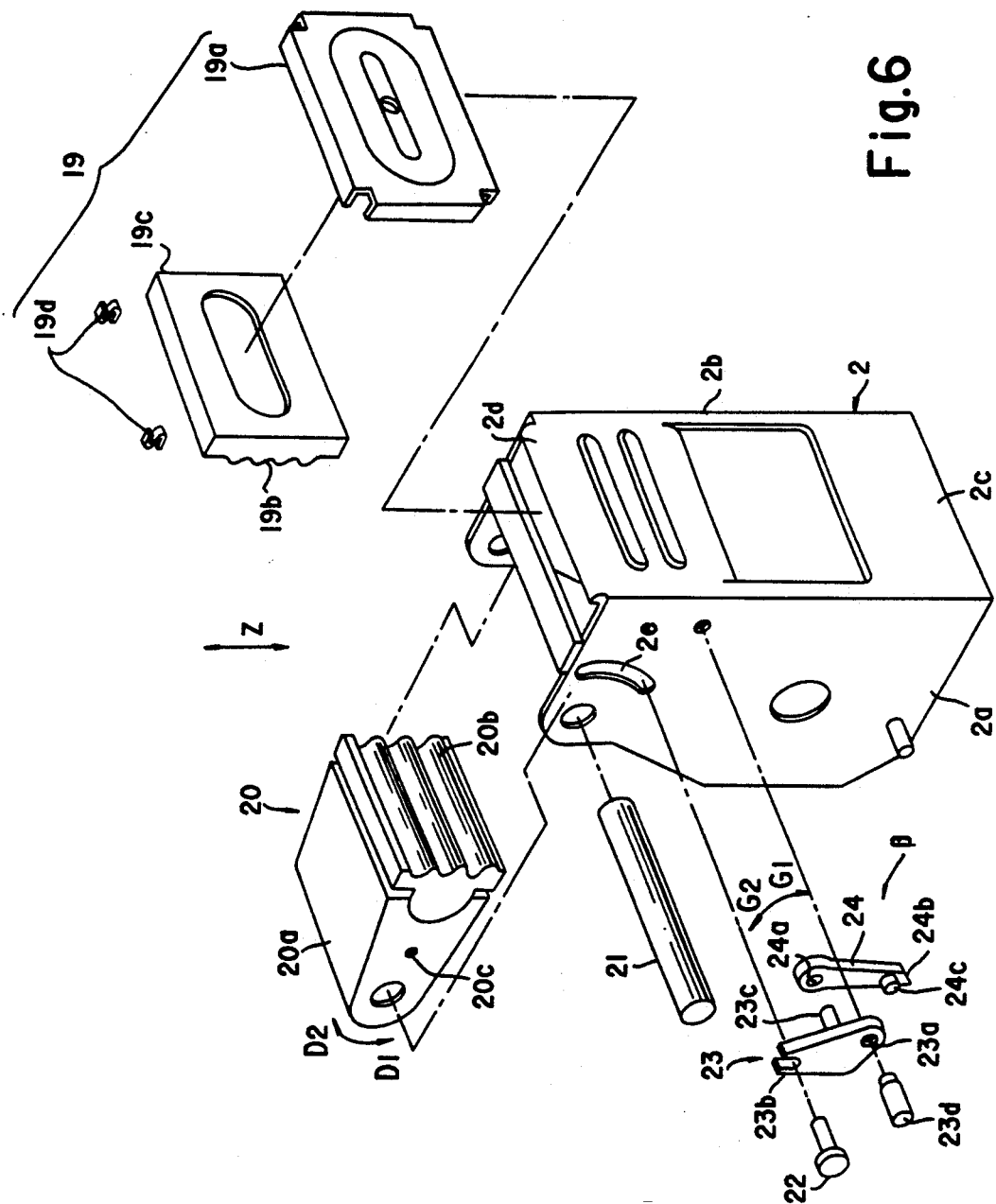
FIG. 6 is an exploded view of second emergency locking means for squeezing and locking the seat belt pulled out of the reel shaft and movement transmitting means β.

The second emergency locking means 5 is provided with a sliding-squeezing member 19, which slidably mounted on the case 2 in the direction to pull out or wind up the seat belt 1 as shown in FIG. 6, and with a rotating-squeezing member 20, one end of which is rotatably mounted on both side walls 2a and 2b of the case 2, and the other end of which is placed face-to-face to the sliding-squeezing member 19 and which squeezes and locks the seat belt 1 between the sliding-squeezing member 19 and the rotating-squeezing member 20 itself.

The sliding-squeezing member 19 is provided with a squeezing member 19a slidably mounted on a squeezing frame 2d, formed by folding and bending a part of a back wall 2c of the case 2, in a direction Z to pull out or wind up the seat belt 1, and also with a squeezing portion 19b having a contact surface with the seat belt 1 and formed in smooth and irregular surface in a direction transverse to the direction Z. It is further provided with a contact member 19c mounted on the squeezing member 19a and with forcing members 19d and 19d always applying force on the squeezing member 19a downward in the direction Z.

The rotating-squeezing member 20 is provided with a main body 20a, one end of which is rotatably mounted on both side walls 2a and 2b of the case by a rotating shaft 21 toward the direction D1 or D2, and further with a clamp member 20b, which is mounted on the other end of the main body 20a rotatably by a predetermined degree and which squeezes the seat belt 1. When this rotating-squeezing member 20 is rotated in the direction D1 and squeezes and locks the seat belt 1 between the sliding-squeezing member 19 and itself, the pulling-out of the seat belt 1 is hindered. In this case, the rotating-squeezing member 20 is rotated toward the direction D1 by the movement transmitting mechanism 8, and the clamp member 20 squeezes the seat belt 1 between the sliding-squeezing member 19 and itself. It is further rotated toward the direction D2 to release the squeezing of the seat belt 1.

Describing the movement transmitting mechanism β in detail, a female screw 20c is provided on an intermediate portion on one side of the rotating-squeezing member 20 as shown in FIG. 6, and a screw member 22 is engaged in this female screw 20c. Also, a transmission member 23 in approximately triangular shape is rotatably mounted on a side wall 2a of the case 2. The transmission member 23 has a through-nole, 23a and a notch 23b at different corners and a projecting shaft 23c is furnished on the other side.

By passing the pin 23d into the through-hole 23a and by fixing it on the side wall 2a of the case 2, the transmission member 23 is rotatably mounted on the side wall 2a of the case 2. Also, by engaging the notch 23b with the screw member 22 mounted on the rotating-squeezing member 20, the transmission member 23 and the rotating-squeezing member 20 are connected rotatably relative to each other. In this case, the notch 23b is formed in cycloid curve to have smooth contact with the screw member 22. Thus, the notch 23b smoothly rotates the rotating-squeezing member 20 when the rotating-squeezing member 20 is within normal rotating range. On the other hand, when a force stronger than a predetermined value is applied on the seat belt 1 and the rotating-squeezing member 20 is rotated out of the normal rotating range, the transmission member 23 is separated from the screw member 22 mounted on one side of the rotating-squeezing member 20 in order not to hinder the rotating displacement.

Further, on the shaft 23c, a second engaging member 24 is rotatably mounted by passing the shaft 23c into a through-hole 24a provided on one end of the second engaging member 24. This engaging member 24 is rotatable in the directions G1 and G2 so that it is engaged with or separated from the ratchet wheel 7. The other end of the second engaging member 24 is formed in a engaging pawl 24b, and a pin 24c is provided between the engaging pawl 24b and the through-hole 24a. This pin 24c is engaged into the guide hole 10e of the lock ring 10. When the lock ring 10 is rotated by more than a predetermined angle, the second engaging member 24 is rotated toward the direction G1, and the engaging pawl 24b is engaged with the tooth of the ratchet wheel 7.

The reference numeral 2e in FIG. 6 represents a hole, into which the screw member 22 passes through and which is in form of a circular arc provided on a side wall 2a of the case 2 in order that the rotating movement of the rotating-squeezing member 20 is not hindered within the rotating range.

As shown in FIGS. 1, 2 and 3, a fragile portion γ is provided near a support section of a rotating shaft 21 on two side walls 2a and 2b of the case 2, and this fragile portion γ is positioned on opposite side to the sliding-squeezing member 19 with respect to the rotating shaft 21. The strength of this fragile portion γ is so designed that it undergoes plastic deformation or rupture when a load F' higher than a predetermined value is applied on it through the rotating-squeezing member 20 and the rotating shaft 21 by very high pulling force on the seat belt 1.

When the fragile portion γ undergoes plastic deformation or rupture, the rotating shaft 21 and the rotating-squeezing member 20 moves toward the direction S, which is the same direction as that of the load F'. That is, the rotating-squeezing member 20 moves toward the direction to separate from the sliding-squeezing member 19. As the result, the rotating-squeezing member 20 can be turned over beyond the rotating range, and the squeezing force on the seat belt 1 by the rotating-squeezing member 20 and the sliding-squeezing member 19 is alleviated.

Figure 7A:
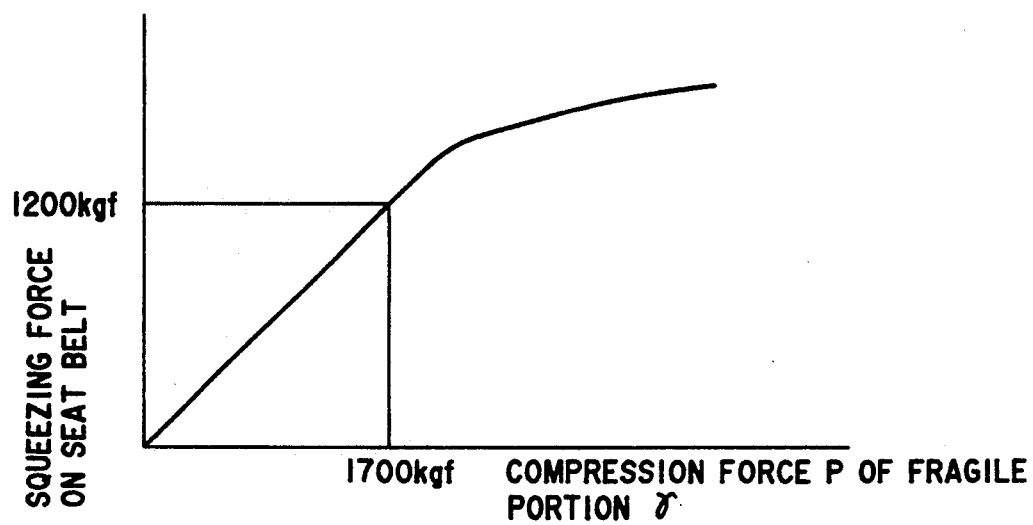
FIG. 7 (a) is a diagram showing the relationship between compression force of the fragile portion and squeezing force of the seat belt.
Figure 7B:
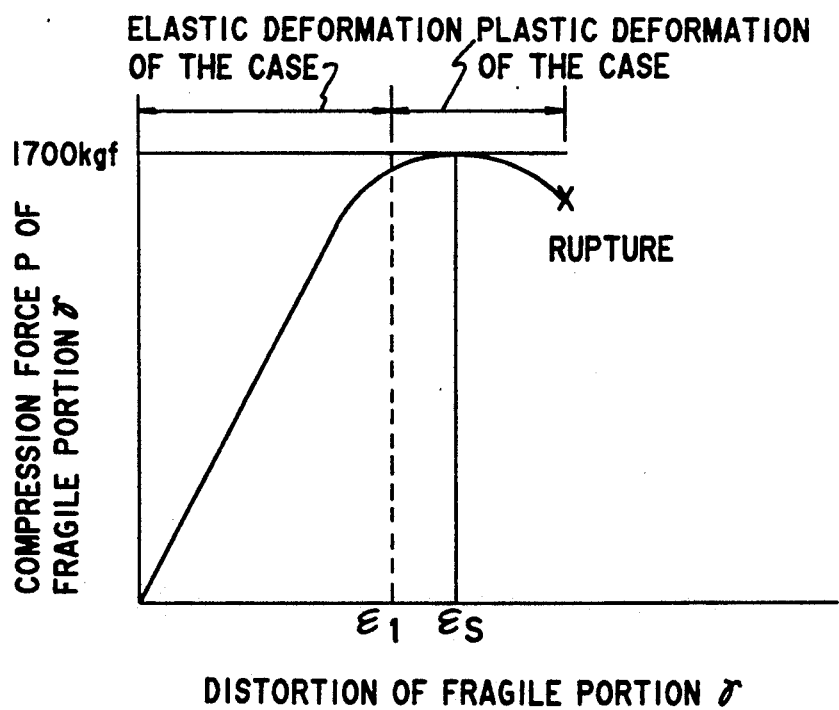

The strength of the fragile portion γ on both side walls 2a and 2b of the case 2 is set as follows: As shown in FIG. 7 (a), if it is set, from compression force P of the fragile portion γ and the squeezing force F on the seat belt 1, that the rotating-squeezing member 20 is turned over when the squeezing force F on the seat belt 1 is 1,200 kgf, the compression force P of the fragile portion γ is set to 1,700 kgf. As shown in FIG. 7 (b), the strength of the fragile portion γ, i.e. stress (compression force P)—distortion $\epsilon$, is set so that maximum distortion $\epsilon_s$ s occurs when the compression force P of the fragile portion γ is 1,700 kgf Thus, the fragile portion γ is plastically deformed at a distortion $\epsilon_1$, which a little lower than the maximum distortion $e_s$. In other words, the plastic deformation of the fragile portion γ begins when the compression force P is a little lower than 1,700 kgf.

Figure 4:
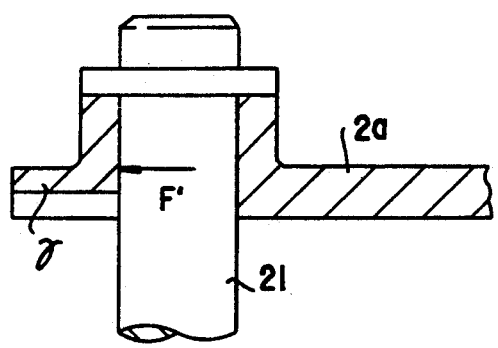
FIG. 4 is a partial enlarged cross-sectional view along the line IV—IV of FIG. 2.

In establishing the strength of the fragile portion γ, i.e. compression force—distortion $\epsilon$, the value of compression force P—distortion $\epsilon$ as desired can be set by adjusting cross-sectional area of the fragile portion γ on both side walls 2a and 2b of the case 2 as shown in FIG. 4. To adjust the cross-sectional area of the fragile portion γ, thickness of the fragile portion γ may be adjusted, or the cross-sectional area may be adjusted by providing a notch or a hole. In case of the present embodiment, the fragile portion γ is designed as thinner than the other portions of the side walls 2a and 2b as shown in FIG. 1.

As shown in FIG. 1, one end of a return spring 25 is connected to the other end of said reel shaft 3, and the other end of the return spring 25 is fixed on the other side wall 2b. Accordingly, the seat belt 1 is pulled out from the reel shaft 3 against the force of the return spring 25 and it is wound up by the force of the return spring 25.

Next, description will be given on the operation of the seat belt retractor of this embodiment, referring to FIG. 5, FIGS. 8 (a)-(e), FIG. 9 and FIG. 10.

Figure 8E:
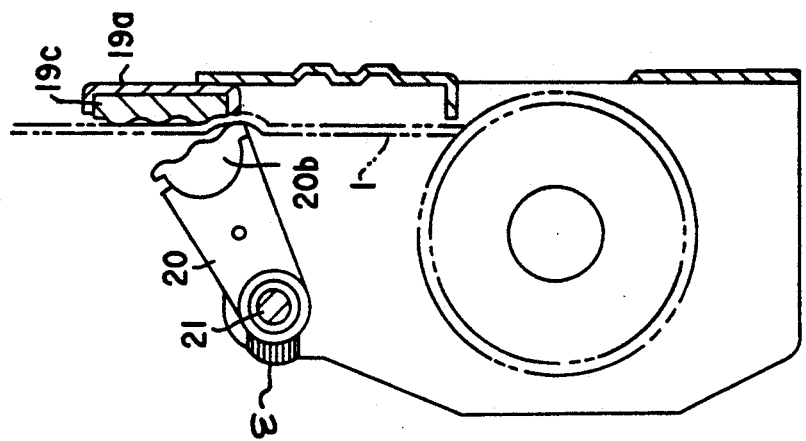
FIG. 8 represents drawings for explaining the operation of the present embodiment.
Figure 8D:
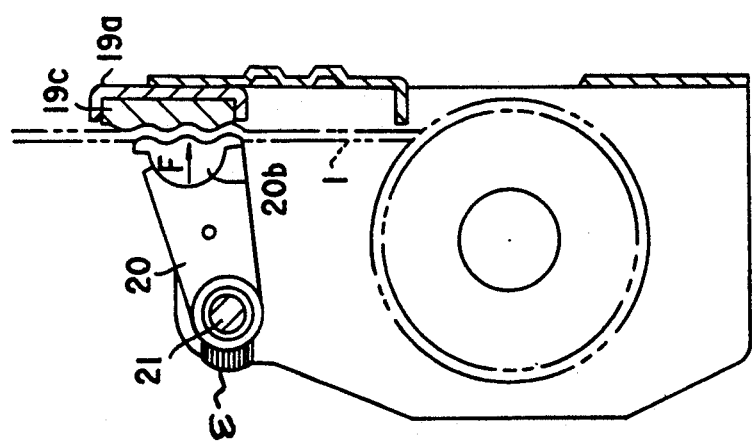

In normal condition when sudden acceleration does not occur due to collision of vehicle, the rotating-squeezing member 20 and the sliding-squeezing member 19 are at non-operating position as shown in FIG. 8 (a), and the seat belt 1 is not squeezed. That is, the second emergency locking means does not lock the seat belt 1.

Figure 9:
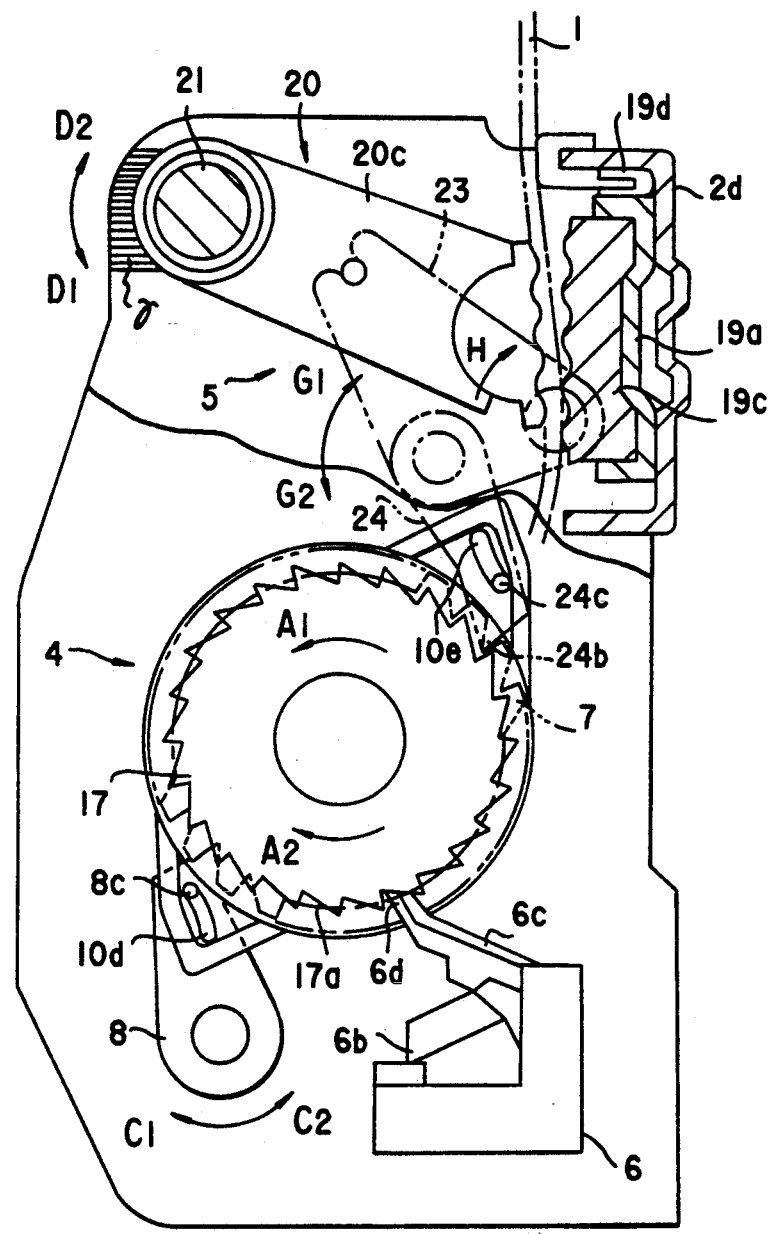
FIG. 9 is a drawing to show operating condition of the second emergency locking means caused by sudden acceleration in the present embodiment.
Figure 12:
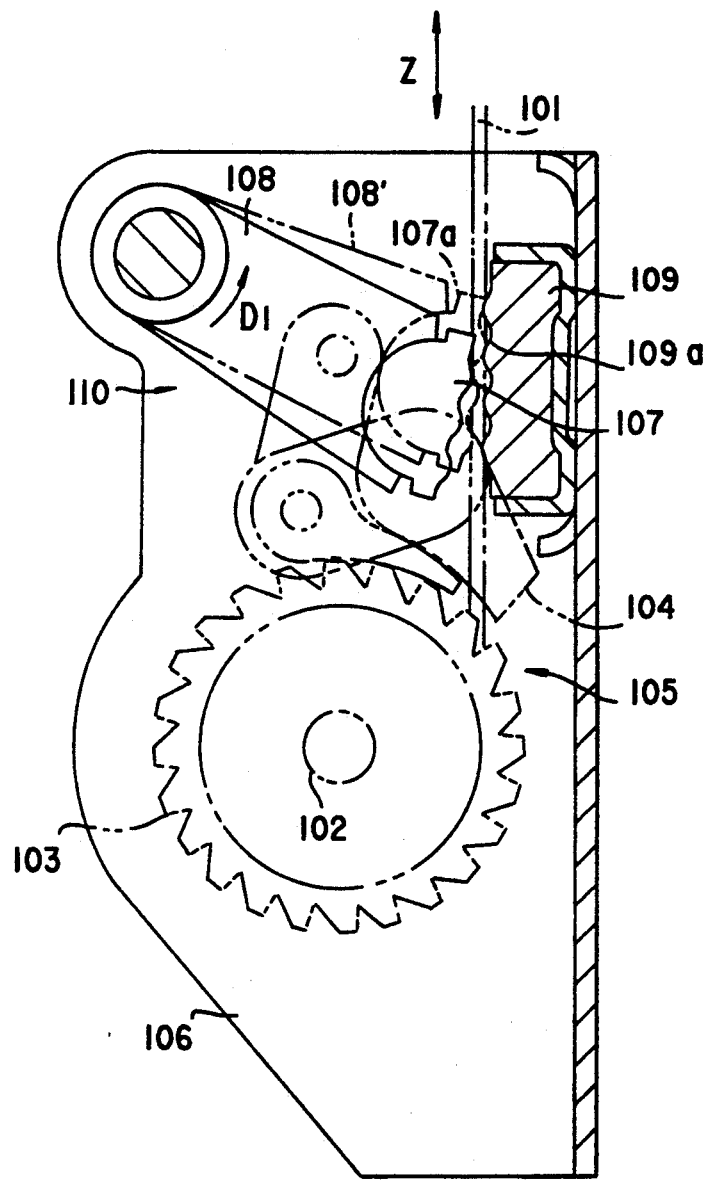
FIG. 12 shows a conventional type seat belt retractor.

When sudden acceleration occurs due to vehicle collision in this normal condition, an inertia body 6b of an acceleration sensor 6 is tilted as shown in FIG. 9, and an actuator 6c is rotated. Then, an engaging pawl 6d is engaged with the ratchet 17a on outer periphery of the ratchet wheel 17. As the result, the ratchet wheel 17 is relatively rotated toward the direction A2 in relation to the reel shaft 3.

This relative rotating displacement is transmitted to the hook 13 through the connecting pin 13b, and the hook 13 is moved toward the direction B2 with the support pin 12a as a rotating center and against the force of compression coil spring 14. Then, the pawl 13a of the hook 13 is engaged with the internal tooth 10c of the lock ring 10. The rotating force of the reel shaft 3 is transmitted through the hook retainer 12, the hook 13, the pawl 13a and the internal tooth 10c, and the lock ring 10 is rotated toward the direction A1 against the force of the spring member 11.

By the rotation of the lock ring 10, the guide pin 24c on the second engaging member 24, inserted into the guide hole 10e of the lock ring 10, is moved along the guide hole 10e, and the second engaging member 24 is rotated toward the direction G1. By the rotation of this second engaging member 24, the engaging pawl 24b is engaged with the ratchet wheel 7. With the rotating displacement of the ratchet wheel 7 toward the direction A1, the transmission member 23 is rotated toward the direction H as shown in FIG. 9. In the displacement of the transmission member 23, the first engaging member 8 is not engaged with the ratchet wheel 7.

When the rotating displacement of the second engaging member 24 toward the direction G1 reaches a predetermined angle, the first engaging member 8 begins to rotate toward the direction C1 to engage with the ratchet wheel 7 as shown in FIG. 9. As the result, the first engaging member 8 is engaged with the ratchet wheel 7 as soon as the seat belt 1 is securely squeezed.

On the other hand, by the rotating displacement of the transmission member 23 toward the direction H, the rotating-squeezing member 20 is rotated toward the arrow direction D1 around the shaft 21 as shown in FIG. 8 (b), and the seat belt 1 is squeezed, which is placed between the sliding-squeezing member 19 at opposed position and the rotating-squeezing member 20. FIG. 9 shows approximately the same condition as that of FIG. 8 (b).

By squeezing operation of the rotating-squeezing member 20 and the sliding-squeezing member 19, the sliding-squeezing member 10 slides upward toward the direction Z for a certain distance following the rotating displacement of the rotating-squeezing member 20 against the force of forcing members 19d and 19d, and the seat belt 1 is locked. Under this condition, the fragile portion $\gamma$ on two side walls 2a and 2b of the case maintains the initial shape without undergoing plastic deformation.

In an emergency such as vehicle collision, the seat belt 1 is locked as described above, and the occupant in the vehicle is restrained by the seat belt.

When the seat belt 1 is pulled upward toward the direction Z by a very strong force as in a case where very high and sudden acceleration occurs on the vehicle, the rotating-squeezing member 20 is rotated and displaced toward the direction D1 from the condition where the seat belt 1 is locked.

By further rotating displacement of this rotating-squeezing member 20, the sliding-squeezing member 19 is slided by breaking an upper end fragile portion of the squeezing frame 2d, as shown in FIG. 8(c). By the rotating displacement of the rotating-squeezing member 20 and upward sliding of the sliding-squeezing member 19, squeezing force F on the seat belt 1 is increased. Because a reaction force F' of this squeezing force F is applied on the fragile portion $\gamma$ on the case side walls 2a and 2b through the rotating-squeezing member 20 and the rotating shaft 21, the compression force P of the fragile portion $\gamma$ is also increased.

Figure 10:
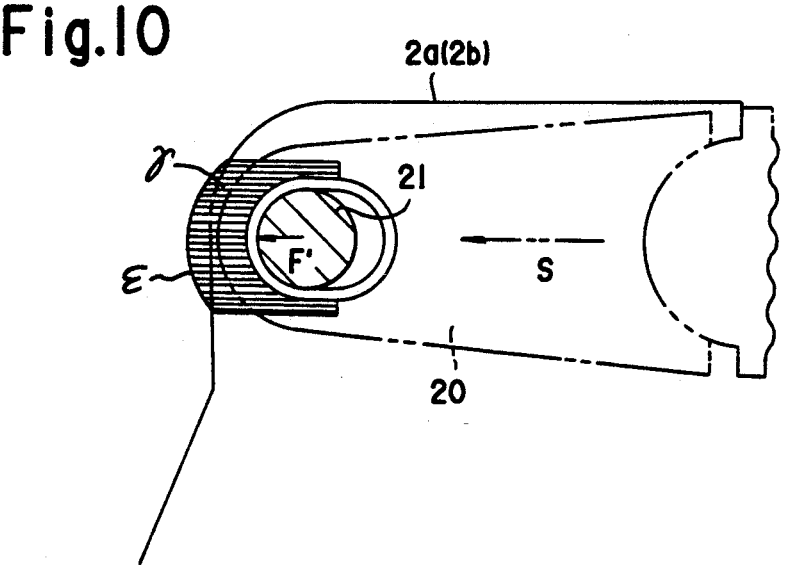
FIG. 10 is a drawing for explaining plastic deformation of the fragile portion of the present embodiment.

When the compression force P of the fragile portion $\gamma$ exceeds a certain value, the fragile portion $\gamma$ begins to undergo plastic deformation (buckling) $\epsilon$ as shown in detail in FIG. 10, and the rotating shaft 21 and the rotating-squeezing member 20 are moved toward the direction S. Thus, the squeezing force on the seat belt 1 begins to decline. When the fragile portion $\gamma$ undergoes maximum plastic deformation $\epsilon$ or rupture, the squeezing force on the seat belt 1 is reduced to the utmost extent. As the result, no concentrated load is applied on the seat belt 1.

As shown in FIG. 8 (d), when the seat belt is pulled out further upward toward the direction Z, the rotating-squeezing member 20 is turned over upward, and the squeezing force F by the rotating-squeezing member 20 and the sliding-squeezing member 19 is further weakened. Finally, the rotating-squeezing member 20 is rotated toward the direction D1 still further as shown in FIG. 8 (e). The seat belt 1 and the clamp member 20b are separated, and the seat belt 1 is released from the squeezed state.

Even when the seat belt 1 is released from the squeezed state, the reel shaft 3 is locked by the first emergency locking means 4, and the seat belt 1 is also locked. Accordingly, even when sufficient squeezing force F is not attained on the seat belt 1 by plastic deformation or rupture of the fragile portion $\gamma$, application of concentrated load on the seat belt 1 can be avoided, and the occupant in the vehicle can be restrained and securely protected.

As described above in detail, when the seat belt 1 is squeezed by the rotating-squeezing member 20 and the sliding-squeezing member 19 in the present embodiment, strong pulling force is applied further on the seat belt 1. When the rotating-squeezing member 20 tends to rotate forcibly toward the direction D1 with the pulling-out of the seat belt 1, the fragile portion $\gamma$ undergoes plastic deformation or rupture to reduce the squeezing force F of the rotating-squeezing member 20 and the sliding-squeezing member 19. As the result, the clamp member 20a does not bite into the seat belt 1, and no force higher than the predetermined value is intensively applied on the squeezed portion of the seat belt squeezed by the rotating-squeezing member 20.

Figure 11:
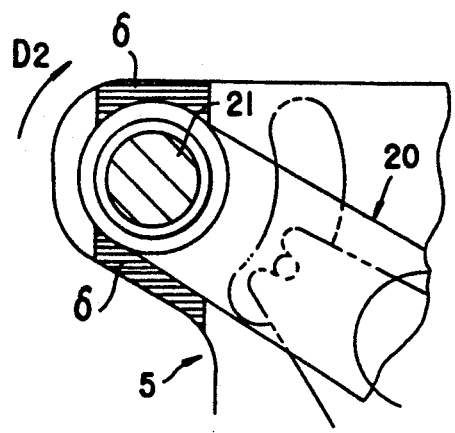
FIG. 11 shows an example of deformation in the present invention.

The present invention is not limited to the above embodiment, and various design modifications can be made. For example, the fragile portion $\gamma$ undergoes buckling deformation by compression in the above embodiment, whereas the fragile portion $\gamma$ may undergo plastic deformation or rupture by pulling as shown in FIG. 11.

As it is evident from the above description, it is possible according to the seat belt retractor of the present invention to prevent concentrated load on seat belt by the squeezing force on the seat belt because the fragile portion of the case undergoes plastic deformation or rupture to reduce the squeezing force on the seat belt by the rotating-squeezing member in case the force applied on the seat belt is too big and the load applied on the seat belt through an end of the rotating-squeezing member exceeds a certain value. Therefore, the occupant in the vehicle can be securely restrained and protected by the seat belt and the reliability can be extensively increased.

What we claim is:
1. A seat belt retractor, comprising:
   a first emergency locking means for locking a reel shaft, on which a seat belt is to be wound up;
   a second emergency locking means for squeezing and locking the seat belt pulled out from the reel shaft;
   said second emergency locking means including a rotating-squeezing member and a sliding squeezing member;

said rotating-squeezing member including a main body;

a fixed case having at least one mounting wall;

one end of said main body being rotatably supported on said at least one mounting wall via a supporting shaft;

said at least one mounting wall being provided with a fragile portion;

said fragile portion including a portion of said at least one mounting wall on a side of said supporting shaft opposite said sliding squeezing member which is deformed or ruptured to reduce squeezing force on said seat belt by said rotating-squeezing member when a load higher than a predetermined value is applied to said sliding squeezing member by said rotating-squeezing member.

2. A seat belt retractor according to claim 1, wherein said load of a predetermined value is set by a cross-sectional area of said fragile portion of said at least one mounting wall.

3. A seat belt retractor according to claim 2, wherein said frame has two opposing generally parallel side walls which form said mounting walls, said fragile portions being located on an area of each said side walls.

4. A seat belt retractor according to claim 1, wherein said fragile portions extend substantially from said supporting shaft to a perimeter edge of said mounting walls.

5. A seat belt retractor according to claim 4, wherein said fragile portion spans across a height which is greater than a width of said supporting shaft at said mounting walls.

6. A seat belt retractor, comprising:

a first emergency locking means for locking a reel shaft, on which a seat belt is to be wound up;

a second emergency locking means for squeezing and locking the seat belt pulled out from the reel shaft;

said second emergency locking means including a rotating-squeezing member and a sliding squeezing member;

said rotating-squeezing member including a main body;

a fixed case having at least one mounting wall;

one end of said main body being rotatably supported on said at least one mounting wall via a supporting shaft;

said at least one mounting wall being provided with a fragile portion;

said fragile portion including a portion of said at least one mounting wall located above said supporting shaft and a portion of said at least one mounting wall located below said supporting shaft which is deformed or ruptured to reduce squeezing force on said seat belt by said rotating-squeezing member when a load higher than a predetermined value is applied to said sliding squeezing member by said rotating-squeezing member.

7. A seat belt retractor, comprising:

a first emergency locking means for locking a reel shaft, on which a seat belt is to be wound up;

a second emergency locking means for squeezing and locking the seat belt pulled out from the reel shaft;

said second emergency locking means including a rotating-squeezing member and a sliding squeezing member;

said rotating-squeezing member including a main body;

a fixed case having at least one mounting wall;

one end of said main body being rotatably supported on said at least one mounting wall via a supporting shaft;

said at least one mounting wall being provided with a fragile portion;

said fragile portion including a portion of said at least one mounting wall adjacent to said supporting shaft and spanning substantially across a width of said supporting shaft at said mounting walls which is deformed or ruptured to reduce squeezing force on said seat belt by said rotating-squeezing member when a load higher than a predetermined value is applied to said sliding squeezing member by said rotating-squeezing member.

* * * * *